(12) United States Patent
Chen et al.

(10) Patent No.: US 9,312,954 B2
(45) Date of Patent: Apr. 12, 2016

(54) LIGHT COMMUNICATION SYSTEM, TRANSMITTER AND RECEIVER

(71) Applicant: Industrial Technology Research Institute, Hsinchu (TW)

(72) Inventors: Ren-JR Chen, Hsinchu (TW);
Chang-Lung Hsiao, Hsinchu (TW);
Chun-Chuan Lin, Hsinchu (TW);
Tsai-Lin Tai, Hsinchu (TW); Lung-Pin Chung, Hsinchu (TW); Hsiu-Hsiang Chen, Hsinchu (TW)

(73) Assignee: INDUSTRIAL TECHNOLOGY RESEARCH INSTITUTE, Hsinchu County (TW)

( * ) Notice: Subject to any disclaimer, the term of this patent is extended or adjusted under 35 U.S.C. 154(b) by 111 days.

(21) Appl. No.: 13/712,748

(22) Filed: Dec. 12, 2012

(65) Prior Publication Data

US 2014/0064739 A1 Mar. 6, 2014

(30) Foreign Application Priority Data

Aug. 28, 2012 (TW) .............................. 101131125 A

(51) Int. Cl.
*H04B 10/00* (2013.01)
*H04B 10/11* (2013.01)
*H04B 10/114* (2013.01)

(52) U.S. Cl.
CPC ............ *H04B 10/11* (2013.01); *H04B 10/1143* (2013.01)

(58) Field of Classification Search
CPC .... H04B 10/11; H04B 10/801; H04B 10/803; H04B 10/1149; H04B 10/503; H04B 10/1143; H04B 10/116; H04B 10/1127; H04B 10/118

USPC ......... 398/128–131, 118, 213, 119, 120, 156, 398/201, 207
See application file for complete search history.

(56) References Cited

U.S. PATENT DOCUMENTS 4,696,062 A * 9/1987 LaBudde ...................... 398/156
5,539,562 A * 7/1996 Morioka et al. .............. 398/131
(Continued)

FOREIGN PATENT DOCUMENTS

| CN | 1316835 A | 10/2001 |
|---|---|---|
| TW | 200840247 | 10/2008 |

OTHER PUBLICATIONS

Singh et al., "A Review on Indoor Optical Wireless Systems," IETE Technical Review, 2002, pp. 1-36.
(Continued)

*Primary Examiner* — Hibret Woldekidan
(74) *Attorney, Agent, or Firm* — Muncy, Geissler, Olds & Lowe, P.C.

(57) ABSTRACT

A light communication system, a transmitter and a receiver are provided. The light communication system includes the transmitter and the receiver. The transmitter has a first processing unit and a light-emitting element. The first processing unit produces a transmission signal. The light-emitting element produces light to carry the transmission signal. The receiver has a first variable lens, a photosensitive element and a second processing unit. The first variable lens changes the propagation path of the light. The photosensitive element senses the light passed through the first variable lens to produce a receiving signal. The second processing unit controls the first variable lens based on the signal quality of the receiving signal to change the equivalent channel between the transmission signal and the receiving signal. Therefore, the transmission capability of the light communication system is enhanced.

10 Claims, 4 Drawing Sheets

(56) References Cited

U.S. PATENT DOCUMENTS

| | | | |
|---|---|---|---|
| 6,219,133 B1* | 4/2001 | Kawase et al. | 356/139.04 |
| 6,456,751 B1* | 9/2002 | Bowers et al. | 385/16 |
| 6,567,574 B1* | 5/2003 | Ma et al. | 385/16 |
| 7,024,070 B2* | 4/2006 | Spivey et al. | 385/17 |
| 7,071,451 B2* | 7/2006 | Ishikawa et al. | 250/201.4 |
| 7,106,925 B2* | 9/2006 | Dames et al. | 385/17 |
| 7,110,633 B1* | 9/2006 | Helkey et al. | 385/16 |
| 7,657,182 B2* | 2/2010 | Hase et al. | 398/120 |
| 7,889,998 B2 | 2/2011 | Son | |
| 8,200,094 B1* | 6/2012 | Zhovnirovsky et al. | 398/129 |
| 8,213,022 B1* | 7/2012 | Riza et al. | 356/609 |
| 2003/0219201 A1* | 11/2003 | Arimoto et al. | 385/31 |
| 2006/0018661 A1* | 1/2006 | Green et al. | 398/128 |
| 2006/0062099 A1* | 3/2006 | Yazaki et al. | 369/44.11 |
| 2007/0206952 A1* | 9/2007 | Hase et al. | 398/118 |
| 2008/0019702 A1* | 1/2008 | Shibatani et al. | 398/182 |
| 2008/0131119 A1* | 6/2008 | Okada et al. | 398/45 |
| 2010/0166028 A1* | 7/2010 | Shibatani et al. | 372/14 |
| 2012/0308239 A1* | 12/2012 | Sheth et al. | 398/131 |
| 2013/0236183 A1* | 9/2013 | Chao et al. | 398/101 |
| 2014/0152796 A1* | 6/2014 | Mitsuhiro et al. | 348/79 |

OTHER PUBLICATIONS

Randel et al., "Advanced Modulation Schemes for Short-Range Optical Communications," IEEE Journal of Selected Topics in Quantum Electronics, vol. 16, No. 5, Sep./Oct. 2010, pp. 1280-1289.

Amirshahi et al., "Broadband Access over Medium and Low Voltag Power-lines and use of White Light Emitting Diodes for Indoor Communications," IEEE CCN Proceedings, 2006, pp. 1-5.

Komine et al., "Fundamental Analysis for Visible-Light Communication System using LED Lights," IEEE Transactions on Consumer Electronics, vol. 50, No. 1, Feb. 2004, pp. 100-107.

Tanaka et al., "Indoor Visible Light Data Transmission System Utilizing White LED Lights," IEICE Trans. Commun., vol. E86-B, No. 8, Aug. 2003, pp. 2440-2454.

Elgala et al., "OFDM Visible Light Wireless Communication Based on White LEDs," Proc. of the 64$^{th}$ IEEE Vehicular Technology Conference (VTC), 2007, pp. 2185-2189.

Office Action dated Jan. 21, 2015 in corresponding TW patent application No. 101131125.

* cited by examiner

LIGHT COMMUNICATION SYSTEM, TRANSMITTER AND RECEIVER

CROSS-REFERENCE TO RELATED APPLICATIONS

This application claimed priority to Taiwanese Patent Application No. 101131125, filed on Aug. 28, 2012. The entirety of the above-mentioned patent application is hereby incorporated by reference herein and made a part of this specification.

BACKGROUND

1. Technical Field

The present disclosure relates to light communication techniques, and, more particularly, to a light communication system, a transmitter and a receiver.

2. Description of Related Art

In optical communication systems and radio frequency (RF) communication systems, the optical characteristics and the RF characteristics are quite different. In the RF communication systems, designs and selections of the "antennas" or precoding techniques can be used to change the equivalent channel in order to enhance the transmission capability of the RF communication system. Such design concepts in the optical communication system have not yet been developed, but the "antennas" in RF communication are analogous to the "lens" of optical communication as optical lens may be used as a transmission medium for the light.

Light-emitting diodes (LEDs) play an important role in the optical communication systems. In recent years, LEDs have achieved significant improvement in terms of performance and brightness, and gradually replace the traditional light sources, such as fluorescent lamps and incandescent lamps. Due to their fast response, LEDs are not only used in lighting systems, but are also used for data transmission.

In terms of data transmission, a transmitter and a receiver in an optical communication system are used for transmission and reception of signals, respectively. Specifically, the transmitter may use the light emitted by an LED to carry signals, and the receiver may use a fixed-focus lens together with a photodiode or a photodetector to receive the light emitted by the LED and decode the signals from the received light.

However, in the above known technique, the receiver (such as a mobile communication apparatus) may move freely in the space, but the fixed focus lens can only provide a fixed focal length and a fixed axial direction. These cannot not be adjusted in accordance with the movement of the receiver, so as a result, the light emitted by the transmitter is scattered or focused with low optical density on the light-emitting diode or the photodetector, resulting in poor quality of the signals received by the receiver and lowering of the transmission capacity of the optical communication system.

Therefore, how to solve the above shortcomings of the prior art has become an important issue for those skilled in the art.

SUMMARY

The present disclosure provides a light communication system, which includes a transmitter and a receiver. The transmitter includes a first processing unit that generates a transmission signal, and a light-emitting unit that emits light that carries the transmission signal. The receiver includes a first variable lens that receives the light emitted by the light-emitting device and changes a propagation path of the light, a photosensitive element that senses the light passing through the first variable lens to produce a receiving signal, and a second processing unit that controls the first variable lens according to a signal quality of the receiving signal in order to change an equivalent channel between the transmission signal and the receiving signal.

The present disclosure further provides a transmitter, which includes a processing unit, a light-emitting element and a variable lens. The processing unit generates a transmission signal. The light-emitting element emits light for carrying the transmission signal. The variable lens changes a propagation path of the light in order for an external receiver to receive the light passing through the variable lens so as to produce a receiving signal. The processing unit produces a control signal based on a feedback signal from the receiver, and uses the control signal to control the variable lens accordingly, which changes the propagation path of the light and an equivalent channel between the transmission signal and the receiving signal.

The present disclosure further provides a receiver, which includes a variable lens, a photosensitive element and a processing unit. The variable lens changes a propagation path of light emitted by an external transmitter, in which the light carrying a transmission signal produced by the transmitter. The photosensitive element senses the light passing through the variable lens and generates a receiving signal. The processing unit generates a control signal based on a signal quality of the receiving signal and uses the control signal to control the variable lens accordingly, which changes the propagation path of the light and an equivalent channel between the transmission signal and the receiving signal.

BRIEF DESCRIPTION OF DRAWINGS

The present disclosure can be more fully understood by reading the following detailed description of the preferred embodiments, with reference made to the accompanying drawings, wherein.

DETAILED DESCRIPTION

Figure 1:
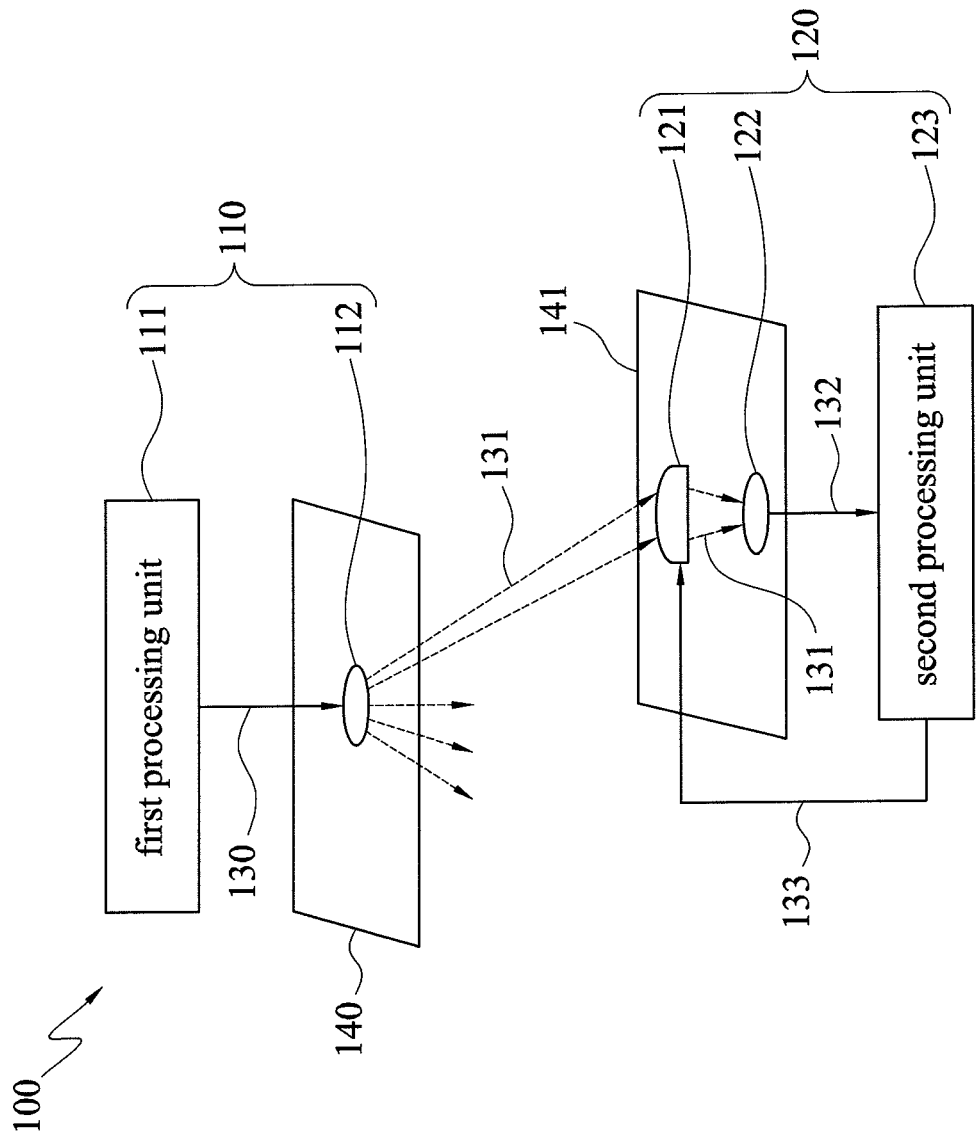
FIG. 1 is a schematic block diagram depicting a Single-Input Single-Output (SISO) light communication system in accordance with the present disclosure.

In the following detailed description, for purposes of explanation, numerous specific details are set forth in order to provide a through understanding of the disclosed embodiments. It will be apparent, however, that one or more embodiments may be practiced without these specific details. In other instances, well-known structures and devices are schematically shown in order to simplify the drawing.

FIG. 1 is a schematic block diagram depicting a Single Input Single Output (SISO) light communication system 100 in accordance with the present disclosure, wherein a receiver includes a variable lens.

As shown, the light communication system 100 is a SISO system, that is, the transmitter 110 of the light communication system 100 includes only one single light-emitting unit 112, and the receiver 120 includes only one single photosensitive element 122. In other embodiments, the light communication system 100 can also be a Multi Input Multi Output (MIMO), a Single Input Multi Output (SIMO), or a Multi Input Single Output (MISO) system.

The light communication system 100 is applicable to a wireless communication system or a lighting system, and includes the transmitter 110 and the receiver 120.

The transmitter 110 includes a first processing unit 111 and the light-emitting unit 112. The first processing unit 111 is used for generating a transmission signal 130. The light-emitting unit 112 can be provided on a platform 140 or a planar surface for carrying the light 131 of the transmission signal 130.

The transmitter 110 can be, for example, a transmitter, a transmitting module, a wireless communication device or a lighting device. The first processing unit 111 can be, for example, a processor, a controller, an encoder or a converter. The light-emitting unit 112 can be, for example, a LED, a laser light or infrared. The transmission signal 130 can be a digital signal or an analog signal. The light 131 can be visible light or invisible light with different wavelengths.

The receiver 120 includes a first variable lens 121, the photosensitive element 122, and a second processing unit 123. The first variable lens 121 is used in conjunction with the photosensitive element 122 for adjusting the propagation path of the light 131 emitted by the light-emitting unit 112. The photosensitive element 122 can be provided on a platform 141 or a planar surface for sensing or receiving the light 131 passing through the first variable lens 121 and generating a receiving signal 132.

The second processing unit 123 is used for generating a first control signal 133 based on the signal quality of the receiving signal 132 and using the first control signal 133 to control the curvature, the angle, the thickness, the focal length or the axial direction of the first variable lens 121 or the spacing between the first variable lens 121 and the photosensitive element 122 accordingly, thereby changing the propagation path of the light 131, and the equivalent channel between the transmission signal 130 and the receiving signal 132.

Assuming a narrowband communication, a mathematical model between the transmission signal 130, the receiving signal 132 and the equivalent channel can be expressed using the following function:

$$r(n)=h*x(n)+v(n),$$

wherein r(n) is the receiving signal 132 including noise, h is the equivalent channel between the transmission signal 130 and the receiving signal 132, x(n) is the transmission signal 130, v(n) is the noise, and n is a time series.

However, the above narrowband communication is only one embodiment of the present disclosure; the light communication system of the present disclosure is also applicable to broadband communication.

The above receiver 120 can be, for example, a receiver, a receiving module, a wireless communication device or a lighting device. The first variable lens 121 can be, for example, a liquid lens, a voice coil motor for lens, a MEMS-based variable micro-lens or piezoelectric material (Pb(ZrTi)O$_3$ or PZT)-based variable lens. The photosensitive element 122 can be, for example, a photodiode, a photo-detector or an image sensor. The second processing unit 123 can be, for example, a processor, a controller or a converter. The receiving signal 132 can be a digital signal or an analog signal.

The above signal quality can include, for example, Received Signal Strength Indication (RSSI), Signal-to-Interference-plus-Noise Ratio (SINR), Bit Error Rate (BER) or Frame Error Rate (FER).

Figure 2:
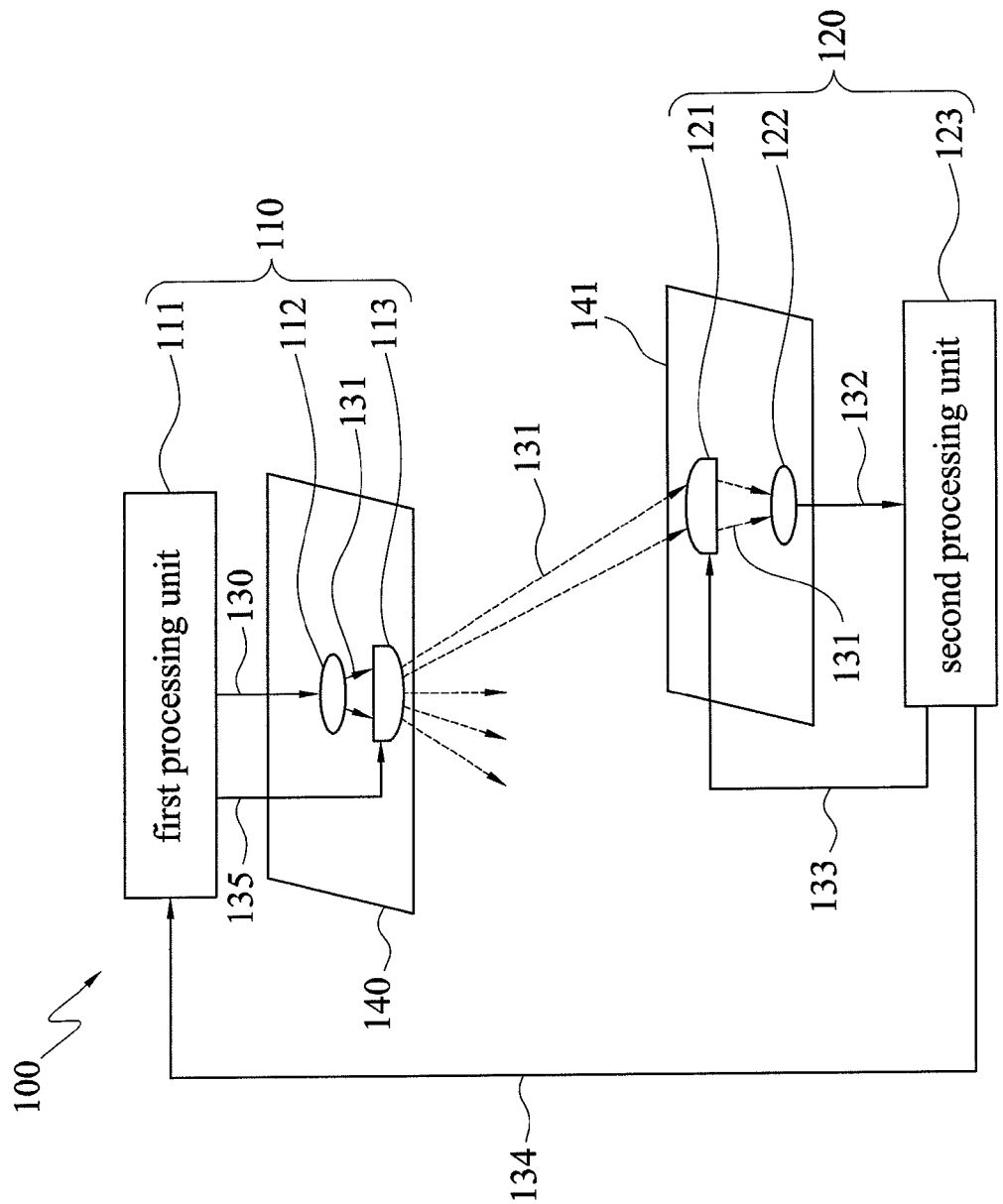
FIG. 2 is a schematic block diagram depicting a SISO light communication system in accordance with the present disclosure, wherein a transmitter and a receiver both have a variable lens.

FIG. 2 is a schematic block diagram depicting a SISO light communication system in accordance with the present disclosure, wherein a transmitter and a receiver both have a variable lens.

The light communication system of FIG. 2 is substantially the same with the light communication system 100 of FIG. 1, so the parts that are the same will not be repeated, and the major difference is described as follows.

In the light communication system 100 of FIG. 2, the transmitter 110 further includes a second variable lens 113. The second variable lens 113 is used in conjunction with the light-emitting unit 112 for adjusting the propagation path of the light 131 emitted by the light-emitting unit 112.

The first processing unit 111 produces a second control signal 135 based on a feedback signal 134 from the second processing unit 123, and uses the second control signal 135 to control the curvature, the angle, the thickness, the focal length or the axial direction of the second variable lens 113 or the spacing between the second variable lens 113 and the light-emitting unit 112 accordingly, thereby changing the propagation path of the light 131, and in turn the equivalent channel.

The above feedback signal 134 can include, for example, signal quality information, direction information, channel information or precoding information.

Figure 3:
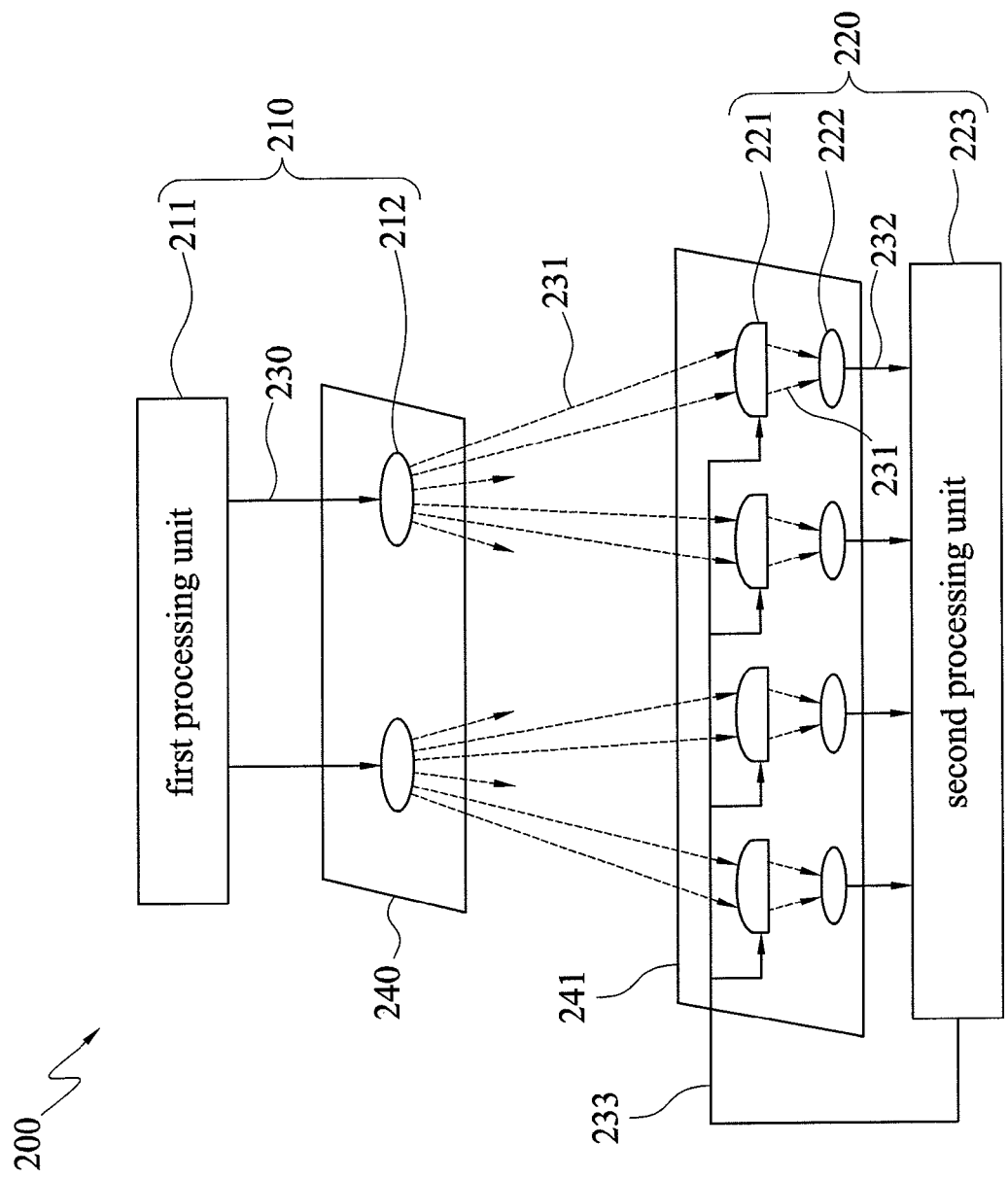
FIG. 3 is a schematic block diagram depicting a Multi-Input Multi-Output (MIMO) light communication system in accordance with the present disclosure.

FIG. 3 is a schematic block diagram depicting a MIMO light communication system 200 in accordance with the present disclosure, wherein a transmitter includes a variable lens.

As shown, the light communication system 200 is a MIMO system, that is, a transmitter 210 of the light communication system 200 includes a plurality of light-emitting unit 212, and a receiver 220 includes a plurality of photosensitive element 222.

The light communication system 200 is applicable to a wireless communication system or a lighting system, and includes the transmitter 210 and the receiver 220.

The transmitter 210 includes a first processing unit 111 and the plurality of light-emitting units 212. The first processing unit 211 is used for generating a plurality of transmission signals 230. The light-emitting units 212 can be provided on a platform 240 or a planar surface for carrying the light 231 of the transmission signals 230. In this embodiment, the numbers of light-emitting units 212 and the transmission signals 230 are both two.

The transmitter 210 can be, for example, a transmitter, a transmitting module, a wireless communication device or a lighting device. The first processing unit 211 can be, for example, a processor, a controller, an encoder or a converter. The light-emitting units 112 can be, for example, LEDs, laser lights or infrared lights. The transmission signals 230 can be digital signals or analog signals. The light 231 can be visible light or invisible light with different wavelengths.

The receiver 220 includes a plurality of first variable lenses 221, the plurality of photosensitive element 222, and a second processing unit 223. In this embodiment, the numbers of first variable lenses 221 and the photosensitive elements 222 are both four.

The first variable lenses 221 are used in conjunction with the photosensitive elements 222 for adjusting the propagation path of the light 231 emitted by the light-emitting units 212.

The photosensitive elements 222 can be provided on a platform 241 or a planar surface for sensing or receiving the light 231 passing through these first variable lenses 221 and generating a plurality of receiving signals 232.

The second processing unit 223 is used for generating a plurality of first control signals 233 based on the signal qualities of the receiving signals 232 and using the first control signals 233 to control the curvatures, the angles, the thicknesses, the focal lengths or the axial directions of the first variable lenses 221 or the spacing between the first variable lenses 221 and the photosensitive elements 222 accordingly, thereby changing the propagation path of the light 231, and the equivalent channels between the transmission signals 230 and the receiving signals 232.

Assuming there are two transmission signals 230 and four receiving signals 232 and a narrowband communication, a mathematical model between the transmission signals 230, the receiving signals 232 and the equivalent channels can be expressed by the following matrix:

$$\begin{bmatrix} r_1(n) \\ r_2(n) \\ r_3(n) \\ r_4(n) \end{bmatrix} = \begin{bmatrix} h_{11} & h_{21} & h_{31} & h_{41} \\ h_{12} & h_{22} & h_{32} & h_{42} \end{bmatrix} * \begin{bmatrix} x_1(n) \\ x_2(n) \end{bmatrix} + \begin{bmatrix} v_1(n) \\ v_2(n) \\ v_3(n) \\ v_4(n) \end{bmatrix}$$

wherein $r_1(n)$-$r_4(n)$ are the receiving signals 232 including noises, $h_{11}$-$h_{42}$ are the equivalent channels between the transmission signals 230 and the receiving signals 232, $x_1(n)$-$x_2(n)$ are the transmission signals 230, $v_1(n)$-$v_4(n)$ are the noises, and n is a time series.

As described before, the light communication system of the present disclosure is also applicable to broadband communication.

The above signal qualities can include, for example, Received Signal Strength Indication (RSSI), Signal-to-Interference-plus-Noise Ratio (SINR), Bit Error Rate (BER), Frame Error Rate (FER) or the rank of the matrix.

Figure 4:
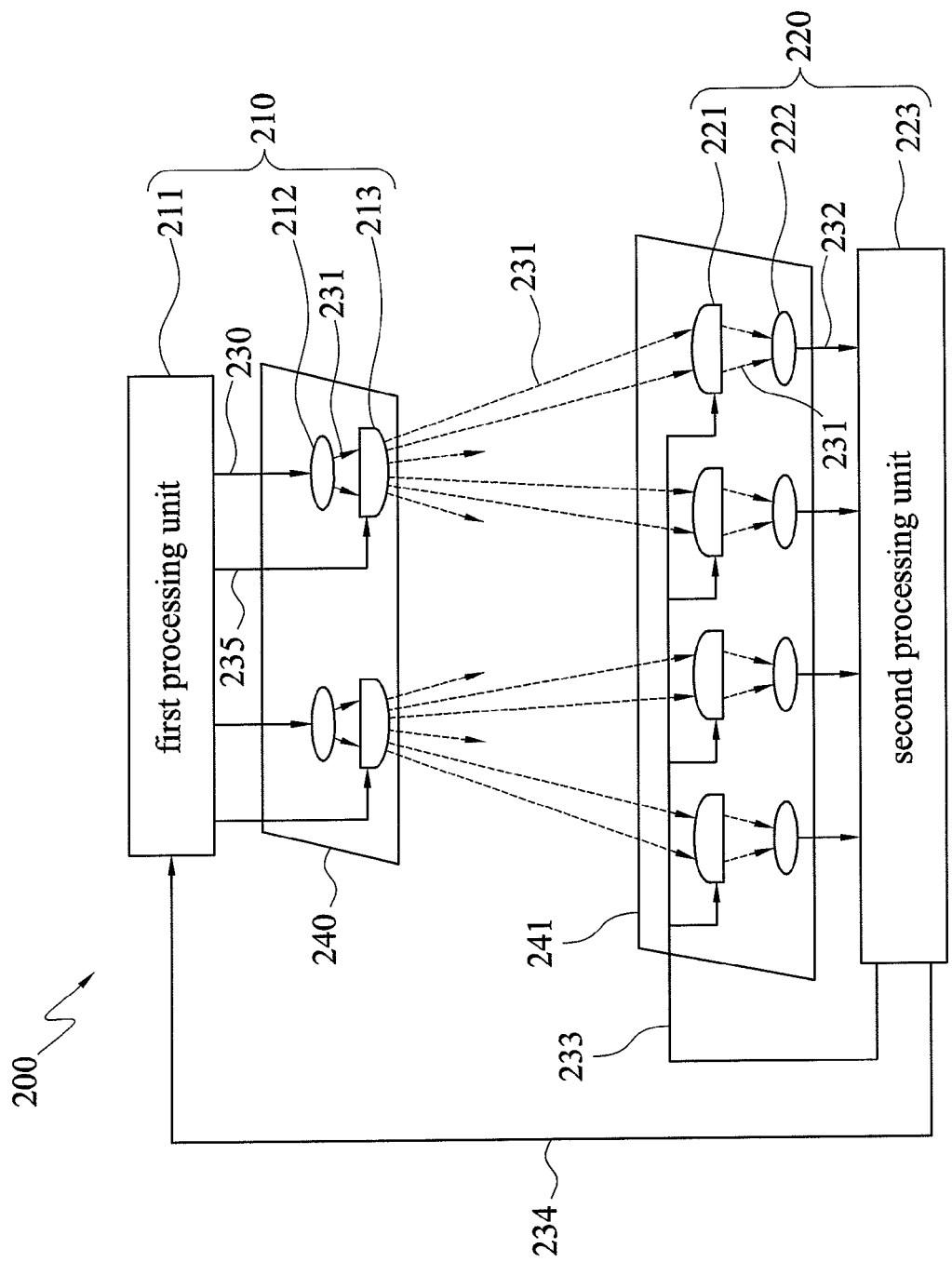
FIG. 4 is a schematic block diagram depicting a MIMO light communication system in accordance with the present disclosure, wherein a transmitter and a receiver both have variable lenses.

FIG. 4 is a schematic block diagram depicting a MIMO light communication system in accordance with the present disclosure, wherein a transmitter and a receiver both have variable lenses.

The light communication system of FIG. 4 is substantially the same with the light communication system 200 of FIG. 3, so the parts that are the same will not be repeated, and the major difference is described as follows.

In the light communication system 200 of FIG. 4, the transmitter 210 further includes a plurality of second variable lenses 213. The transmitter 210 has two second variable lenses 213 in this embodiment. The second variable lenses 213 are used in conjunction with the light-emitting units 212 for adjusting the propagation path of the light 231 emitted by the light-emitting units 212.

The first processing unit 211 produces a plurality of second control signals 235 based on feedback signals 234 from the second processing unit 223, and uses the second control signals 235 to control the curvatures, the angles, the thicknesses, the focal lengths or the axial directions of the second variable lenses 213 or the spacing between the second variable lenses 213 and the light-emitting units 212 accordingly, thereby changing the propagation path of the light 231, and in turn the equivalent channels.

The above feedback signals 234 can include, for example, signal quality information, direction information, channel information, precoding information or information on the rank of the matrix.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A light communication system, comprising:
a transmitter including a first processing unit that generates a transmission signal, and at least two light-emitting diodes arranged in a first column that emit light that carries the transmission signal; and
a receiver including at least two first variable lenses arranged in a second column that correspond to the at least two light-emitting diodes in the first column to receive the light emitted by the at least two light-emitting diodes and change a propagation path of the light, at least two photosensitive elements arranged in a third column that correspond to the at least two first variable lenses in the second column to sense the light passing through the at least two first variable lenses to produce receiving signals, and a second processing unit that respectively controls the at least two first variable lenses according to signal qualities of the receiving signals of the at least two photosensitive elements in order to change equivalent channels between the transmission signal of the first processing unit and the receiving signals of the at least two photosensitive elements.

2. The light communication system of claim 1, wherein the second processing unit produces a first control signal based on the signal qualities of the receiving signals and uses the first control signal to control curvatures, angles, thicknesses, focal lengths, axial directions or refractive indexes of the at least two first variable lenses or spacing between the at least two first variable lenses and the at least two photosensitive elements accordingly in order to change the propagation paths of the light and in turn the equivalent channels.

3. The light communication system of claim 1, wherein the transmitter further includes a second variable lens, and the first processing unit produces a second control signal based on a feedback signal of the second processing unit, and uses the second control signal to control a curvature, an angle, a thickness, a focal length, an axial direction or a refractive index of the second variable lens or a spacing between the second variable lens and the light-emitting diode accordingly in order to change the propagation paths of the light and in turn the equivalent channels.

4. The light communication system of claim 3, wherein the first variable lens or the second variable lens is one selected from the group consisting of a liquid lens, a MEMS-based variable micro-lens, and a piezoelectric material ($Pb(ZrTi)O_3$ or PZT)-based variable lens.

5. The light communication system of claim 3, wherein the signal quality includes Received Signal Strength Indication (RSSI), Signal-to-Interference-plus-Noise Ratio (SINR), Bit Error Rate (BER), Frame Error Rate (FER) or matrix rank, and the feedback signal includes signal quality information, direction information, channel information, precoding information or information on matrix rank.

6. The light communication system of claim 1 being a Multi Input Multi Output (MIMO) system.

7. A transmitter, which proceeds light communication with an external receiver, the transmitter comprising:
a processing unit that generates transmission signals;
at least two light-emitting diodes arranged in a first column that emit light that carries the transmission signals; and at least two variable lenses arranged in a second column that correspond to the at least two light-emitting diodes in the first column to receive the light emitted by the at least two light-emitting diodes, and change a propagation path of the light, wherein at least two photosensitive elements of the receiver arranged in a third column correspond to the at least two variable lenses in the second column to receive the light passing through the at least two variable lenses so as to produce receiving signals, the processing unit produces control signals based on a feedback signal produced by the receiver, and uses the control signals produced based on the feedback signal to control the at least two variable lenses accordingly, which change the propagation paths of the light and equivalent channels between the transmission signals of the processing unit and the receiving signals of the receiver.

8. The transmitter of claim 7, wherein the processing unit uses the control signals to control curvatures, angles, thicknesses, focal lengths, axial directions or refractive indexes of the at least two variable lenses or spacing between the at least two variable lenses and the light-emitting diode accordingly in order to change the propagation paths of the light and in turn the equivalent channels.

9. A receiver, which proceeds light communication with an external transmitter, the receiver comprising:
    at least two variable lenses that have adjustable curvatures, thicknesses or refractive indexes, wherein at least two light-emitting diodes of the transmitter are arranged in a first column, the at least two variable lenses are arranged in a second column correspond to the at least two light-emitting diodes in the first column and change propagation paths of light emitted by the at least two light-emitting diodes, the light carries a transmission signal produced by the at least two light-emitting diodes;
    at least two photosensitive elements arranged in a third column that correspond to the at least two variable lenses in the second column to sense the light passing through the at least two variable lenses and generate receiving signals; and
    a processing unit that generates control signals based on signal qualities of the receiving signals and uses the control signals to control the curvatures, thicknesses or refractive indexes of the at least two variable lenses accordingly, which changes the propagation paths of the light and equivalent channels between the transmission signals of the transmitter and the receiving signal of the at least two photosensitive elements.

10. The receiver of claim 9, wherein the processing unit further uses the control signals to control angles, focal lengths or axial directions of the at least two variable lenses or spacing between the at least two variable lenses and the at least two photosensitive elements accordingly in order to change the propagation paths of the light and in turn the equivalent channels.

* * * * *